Figures 1, 2:
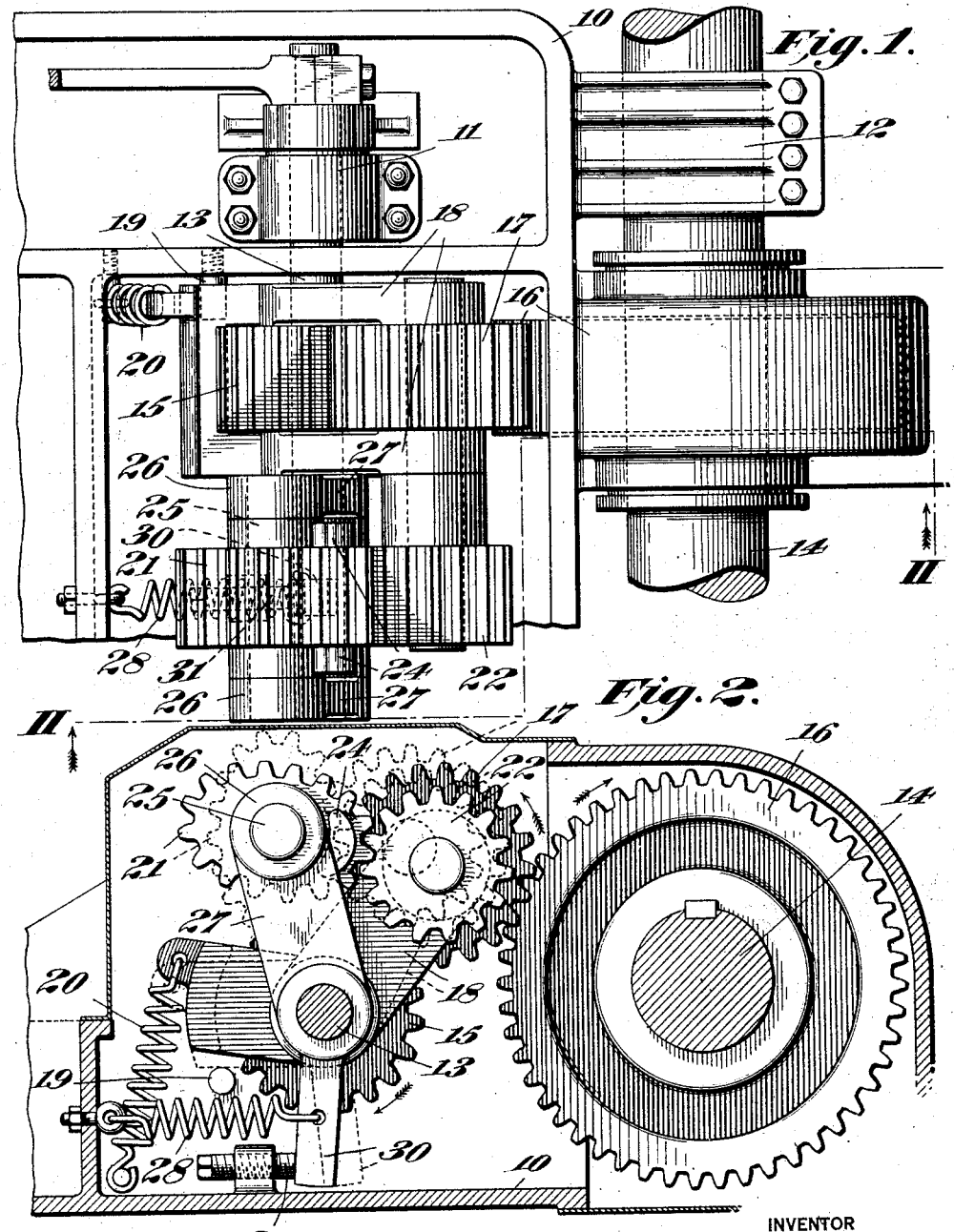

June 1, 1926.  1,586,581

C. SCHENCK

ENTRAINMENT GEARING

Filed July 9, 1925

INVENTOR
Charles Schenck
BY and R.S.A. Dougherty
A.B. Reavis
ATTORNEYS

Patented June 1, 1926.

1,586,581

UNITED STATES PATENT OFFICE.

CHARLES SCHENCK, OF BETHLEHEM, PENNSYLVANIA, ASSIGNOR TO BETHLEHEM STEEL COMPANY.

ENTRAINMENT GEARING.

Application filed July 9, 1925. Serial No. 42,436.

My invention relates to connectible and disconnectible gearing of a type suitable for connecting and disconnecting a motor or an engine with respect to a driven member or axle, and it has for an obejct to provide apparatus of this character incorporating, as the connecting and disconnecting element, a tumbler gear which is automatically translated into engagement with the driven gear when the driving gear and tumbler are turned in predetermined directions.

More particularly, my invention has for its object to provide positively operating mechanism to assure translatory movement of the tumbler gear when the latter is turned in a given direction, in order to assure that such tumbler gear may be meshed with a driven gear; and, to this end, I provide a gear member of variable radius having a portion of smaller radius adapted for meshing relation with respect to the tumbler gear when the latter is in demeshed position, and whose increasing radius is effective, when the tumbler gear is turned in a given direction, to cause the latter to be positively moved or translated in a meshing direction with respect to a driven gear.

In connection with the problem of transmitting power from an auxiliary engine or motor, for example, a steam engine, to an axle of a truck of a railway vehicle, it is desirable, from the standpoints of operational and mechanical simplicity, that the meshing and demeshing of the gearing shall take place wholly in response to energization and de-energization of the auxiliary motor or engine. In other words, when the auxiliary motor or engine is energized, rotation of its driving shaft or member should automatically, and by virtue of such rotation, establish a driving connection with respect to a load-bearing axle; and, by the same token, the act of de-energization of the driving motor or engine should result in automatic disconnection of the gearing wholly in consequence of cessation of motion of the driving member or shaft of the engine. In this way, complicated arrangements, heretofore proposed for connecting and disconnecting the gearing, are avoided.

In accordance with my invention, I provide a driving gear which constantly meshes with a tumbler gear, the latter being carried by a frame or carrier and normally demeshed from a driven gear, this normal demeshed position of the tumbler gear being assured by suitable spring means associated with the carrier. In order to cause the tumbler gear to be translated into meshing relation with the driven gear, when the driving gear is rotated in a given direction, I provide a gear member of variable radius, preferably a gear of elliptical form, which has a portion of smaller radius adapted for meshing relation with respect to the tumbler gear when the latter occupies its demeshed position, whereby, when the tumbler gear is turned in a given direction, the increasing radius of the gear member of variable radius will be effective to positively impart translatory motion to the tumbler gear in a meshing direction.

Apparatus made in accordance with my invention is illustrated in the accompanying drawings, forming a part of this application, in which:

Fig. 1 is a fragmentary plan view of apparatus showing my invention applied thereto; and, Fig. 2 is a vertical sectional view taken along the line II—II of Fig. 1.

Referring now to the drawings more in detail, I show a framework or support 10 having bearings 11 and 12 for driving and driven shafts or members 13 and 14, respectively. A driving gear 15 is carried by the shaft 13 while a driven gear 16 is carried by the shaft or member 14. A tumbler gear 17 constantly meshes with the driving gear 15 and it is carried by a suitable frame 18 for confining movement thereof to meshing and demeshing positions with respect to the driven gear 16, the meshed position of the tumbler gear 17 and of the frame 18 being indicated in full lines on the drawing and the demeshed position being shown in dotted lines in Fig. 2.

Any suitable biasing means, for example, the spring tension device 20, may be associated with the frame 18 for the purpose of moving the tumbler gear in a demeshing direction to its demeshed position where the frame 18 contacts with a suitable abutment 19 carried by the support 10.

In order to assure that the tumbler gear 17 shall be brought into meshing relation with respect to the driven gear 16 wholly in consequence of rotation of the driving shaft 13 and the driving gear 15, I provide a gear 21 of variable radius and which has a portion of minor radius adapted for meshing relation with respect to a gear member or element 22 unitary with the tumbler gear 17. With this arrangement of parts, it will be apparent that, upon rotation of the driving gear 15 in a clockwise direction and rotation of the tumbler gear 17 in a counter-clockwise direction, the gear member 21 of variable radius will be turned and thereby progressively bring portions thereof of increasing radius into engagement with the gear member 22, in this way causing the tumbler gear 17 to be translated toward the driven gear 16 for meshing relation with respect to the latter.

With the arrangement of gearing shown and with the gears rotating in the directions indicated, the effect of the gear 15 being a driving gear for the gear 16 is not only to transmit power to the latter but also to develop a force tending to hold the tumbler gear 17 in mesh with the gear 16 and tending to cause such tumbler to completely mesh with the driven gear upon initial engagement of the tips of the tumbler gear teeth between the tips of the driven gear teeth. Hence it is possible for the tumbler gear member 22 to be entirely disengaged from the gear member 21 of variable radius during completion of the meshing relation between the tumbler gear and the driven gear. In other words, it would be possible, with this arrangement, to have the gear of variable radius maintained in mesh with the gear member 22 until tips of the teeth of the tumbler gear 17 just start to engage between tips of the teeth of the gear 16; and, thereafter, the tendency of the tumbler gear 17 to continue its movement in a meshing direction due to the action of the gearing, as hereinafter set forth, be relied upon to effect complete meshing.

Preferably, however, I provide a gear 21 of elliptical outline which has its major and minor radii so chosen that the minor radius is suitable for defining the demeshed position of the tumbler gear 17 while, when the portion of the gear 21 of major radius is enmeshed with the gear 22, the teeth of the tumbler 17 will be enmeshed with the teeth of the driven gear 16. Once the tumbler 17 is meshed with the driven gear 16, such tumbler will be maintained forcibly in mesh as long as the gear 15 is the driving element. Continued rotation of the tumbler gear 17, after the latter is meshed with the gear 16, results in further rotation of the elliptical gear until, due to diminishing radii thereof, it is entirely disengaged from the gear portion 22 of the tumbler gear 17; and the eccentric loading or counterweighting of the elliptical gear, a counterweight being indicated at 24, assures that such elliptical gear shall turn back to proper position with a portion of minor radius in opposition to the tumbler gear.

When the frame 18 and the tumbler gear 17 move in a demeshing direction, that is, in a counter-clockwise direction, as shown in Fig. 2, it is desirable that means be provided to avoid excessive impact between the elliptical gear 21 and the gear portion 22 and to assure that a meshing relation shall take place between these gear members. To this end, I show the elliptical gear 21 supported by a shaft 25 carried by bearings 26 on a supporting member 27. The supporting member 27 is yieldably mounted in any suitable manner so that, upon impact of the gear member 22 with the elliptical gear 21, the latter gear and its support are capable of movement in the demeshing direction in opposition to suitable spring means 28, whereby violent impact or clashing of the gear member 22 and the elliptical gear 21 is avoided and the meshing of these gear members is facilitated. After meshing of the latter gear members, if there has been any deflection of the spring means 28, restitution of the latter brings the supporting member back to normal position where a stop member 30 on the support comes in contact with an abutment 31 on the frame 10, the abutment preferably being made adjustable.

Assuming that the tumbler gear occupies its demeshed position, indicated in dotted lines in Fig. 2, and that the driving gear is caused to rotate in a clockwise direction, counter-clockwise rotation of the tumbler gear, due to the cooperation of the gear member 22 and the elliptical gear 21, brings about movement of the tumbler gear 17 and its carrier 18 in a meshing direction. Should the teeth of the tumbler gear register with spaces between teeth of the gear 16, the meshing relation will be directly established without any further movements or operations; however, should the tips of the tumbler teeth meet the tips of the driven gear teeth, continued rotation of the tumbler results in rotation of the elliptical gear 21 and backward motion of the support 27 against the tension of the spring 28, and, as soon as the abutting tumbler tooth shall have moved sufficiently to enter a space of the driven gear, the energy of the spring means will be effective to establish the meshing relation quickly.

It will be obvious to those skilled in the art that the elliptical gear member might engage the tumbler gear directly. Hence, in the following claims, I use the term "tumbler gear unit" to cover any construction of tumbler gear capable of acting with a gear of variable radius to establish the meshing relation.

Having thus described the invention, what I claim as new and desire to secure by Letters Patent is:

1. In gearing mechanism, the combination of a driving gear, a driven gear, a tumbler gear unit constantly in mesh with the driving gear, a carrier for the tumbler gear unit for confining movement thereof to meshed and demeshed positions with respect to the driven gear, and a gear of variable radius having a portion thereof of smaller radius engaging teeth of the tumbler gear unit when the latter is in demeshed position, whereby, when the driving gear and tumbler gear unit are rotated, the gear of variable radius will be effective to shift the tumbler gear unit in a meshing direction with respect to the driven gear.

2. In gearing mechanism, the combination of a driving gear, a driven gear, a tumbler gear unit constantly in mesh with the driving gear, a carrier for the tumbler gear unit for confining movement thereof to meshed and demeshed positions with respect to the driven gear, a gear of variable radius having a portion of smaller radius engaging the tumbler gear unit for causing the latter to be traversed in a meshing direction with respect to the driven gear upon actuation of the driving gear, and means for returning the gear of variable radius to a predetermined position so that a portion thereof of smaller radius may be engaged by the tumbler gear unit when the latter is demeshed from the driven gear.

3. In gearing mechanism, the combination of a driving gear, a driven gear, a tumbler gear unit constantly in mesh with the driving gear, a carrier for the tumbler gear unit for confining translatory movement thereof to meshed and demeshed positions with respect to the driven gear, and an elliptical gear adapted to have a portion thereof of smaller radius geared to the tumbler gear unit when the latter is in demeshed position, whereby, when the tumbler gear unit is rotated, the increasing radius of the elliptical gear will be effective to traverse the tumbler gear in a meshing direction with respect to the driven gear, said elliptical gear being eccentrically weighted so that a portion of minor radius may be disposed for meshing relation with respect to the tumbler gear unit when the latter is demeshed from the driven gear.

4. In gearing mechanism, the combination of a driving gear, a driven gear, a tumbler gear unit constantly in mesh with the driving gear, a carrier for the tumbler gear unit for confining movement of the latter to demeshed and meshed positions with respect to the driven gear, means for biasing the carrier to move the latter in a demeshing direction, a gear of variable radius having a portion of smaller radius adapted for meshing relation with the tumbler gear unit when the latter is in demeshed position, whereby, when the tumbler gear unit is turned in one direction, the increasing radius of the gear of variable radius will be effective to traverse the tumbler gear unit in a meshing direction with respect to the driven gear, said gear of variable radius being eccentrically weighted so that, upon disengagement thereof from the tumbler gear unit while the latter is being meshed with the driven gear, it will return to a position with a portion thereof of smaller radius disposed for meshing relation with the tumbler gear unit when the latter engages the gear of variable radius upon demeshing movement, means for supporting the gear of variable radius, and resilient means cooperating with the supporting means.

5. In gearing mechanism, the combination of a driving gear, a driven gear, a tumbler gear unit constantly in mesh with the driving gear, a carrier for confining translatory movement of the tumbler gear unit to meshed and demeshed positions with respect to the driven gear, spring means for moving the frame in a demeshing direction, an elliptical gear having a portion thereof of smaller radius adapted for meshing relation with respect to the tumbler gear unit at the side of the latter opposite to the driven gear when the tumbler gear unit is in demeshed position, bearings for supporting the elliptical gear, supporting means for the bearings including spring means disposed at the sides of the latter opposite to the tumbler gear unit, and counterweight means carried by the elliptical gear for causing the latter to return to normal position when released from the tumbler gear unit upon meshing movement, whereby, a portion of said elliptical gear of smaller radius may be disposed for meshing relation with respect to the tumbler gear unit when the latter completes its movement in a demeshing direction.

In testimony whereof I hereunto affix my signature this 3rd day of July 1925.

CHARLES SCHENCK.